US012614121B2

(12) United States Patent
Zogaj et al.

(10) Patent No.: US 12,614,121 B2
(45) Date of Patent: Apr. 28, 2026

(54) LEARNING HYPER-PARAMETER SCALING MODELS FOR UNSUPERVISED ANOMALY DETECTION

(71) Applicant: Oracle International Corporation, Redwood Shores, CA (US)

(72) Inventors: Fatjon Zogaj, Zurich (CH); Yasha Pushak, Vancouver (CA); Hesam Fathi Moghadam, Sunnyvale, CA (US); Sungpack Hong, Palo Alto, CA (US); Hassan Chafi, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 713 days.

(21) Appl. No.: 18/075,784

(22) Filed: Dec. 6, 2022

(65) Prior Publication Data

US 2024/0095604 A1 Mar. 21, 2024

Related U.S. Application Data

(60) Provisional application No. 63/408,602, filed on Sep. 21, 2022.

(51) Int. Cl.
*G06N 20/20* (2019.01)
*G06F 16/23* (2019.01)
*G06N 20/00* (2019.01)

(52) U.S. Cl.
CPC ......... *G06N 20/20* (2019.01); *G06F 16/2365* (2019.01); *G06N 20/00* (2019.01)

(58) Field of Classification Search
CPC ..... G06N 20/20; G06N 20/00; G06F 16/2365
See application file for complete search history.

(56) References Cited

U.S. PATENT DOCUMENTS 11,392,859 B2 7/2022 Basu et al.
11,868,854 B2 1/2024 Moharrer et al.
(Continued)

FOREIGN PATENT DOCUMENTS

EP 3 101 599 A2 12/2016
WO WO 2008/133509 A1 11/2008

OTHER PUBLICATIONS

Soenen et al., "The effect of hyperparameter tuning on the comparative evaluation of unsupervised anomaly detection methods", KDD'21, 2021 (Year: 2021).*
(Continued)

*Primary Examiner* — Tsu-Chang Lee
(74) *Attorney, Agent, or Firm* — Hickman Becker Bingham Ledesma LLP

(57) ABSTRACT

A computer sorts empirical validation scores of validated training scenarios of an anomaly detector. Each training scenario has a dataset to train an instance of the anomaly detector that is configured with values for hyperparameters. Each dataset has values for metafeatures. For each predefined ranking percentage, a subset of best training scenarios is selected that consists of the ranking percentage of validated training scenarios having the highest empirical validation scores. Linear optimizers train to infer a value for a hyperparameter. Into many distinct unvalidated training scenarios, a scenario is generated that has metafeatures values and hyperparameters values that contains the value inferred for that hyperparameter by a linear optimizer. For each unvalidated training scenario, a validation score is inferred. A best linear optimizer is selected having a highest combined inferred validation score. For a new dataset, the best linear optimizer infers a value of that hyperparameter.

20 Claims, 5 Drawing Sheets

(56) References Cited

U.S. PATENT DOCUMENTS

| | | | |
|---|---|---|---|
| 2014/0188768 A1 | 7/2014 | Bonissone et al. | |
| 2018/0060330 A1 | 3/2018 | Clinton et al. | |
| 2018/0336453 A1 | 11/2018 | Merity et al. | |
| 2019/0095756 A1 | 3/2019 | Agrawal | |
| 2019/0121919 A1 | 4/2019 | Rafaila | |
| 2019/0244139 A1* | 8/2019 | Varadarajan | G06N 20/10 |
| 2020/0038378 A1* | 2/2020 | Crew | A61K 47/545 |
| 2020/0242400 A1 | 7/2020 | Perkins | |
| 2020/0334569 A1 | 10/2020 | Moghadam | |

OTHER PUBLICATIONS

Purohit et al., "Deep autoencoding GMM-based unsupervised anomaly detection in acoustic signals and its hyper-parameter optimization", Detection and Classification of Acoustic Scenes and Events 2020, Nov. 2-3, 2020, Tokyo, Japan, 2020 (Year: 2020).*

Xu et al., "Automatic hyperparameter tuning method for local outlier factor, with applications to anomaly detection", 2019 IEEE International conference on big data, 2019 (Year: 2019).*

Malkomes, Gustavo, et al.,"Bayesian optimization for automated model selection", NIPS 2016, (https://proceedings.neurips.cc/paper/2016/file/3bbfdde8842a5c44a0323518eec97cbe-Paper.pdf) Dec. 2016, 9 pages.

Le Clei et al.,"N-1 Experts: Unsupervised Anomaly Detection Model Selection", in First Conference on Automated Machine Learning (Late-Breaking Workshop), dated May 2022, 14 pages.

Bergstra et al., "Hyperopt: A Python Library for Model Selection and Hyperparameter Optimization", Computational Science & Discovery, vol. 8, No. 1, DOI: 10.1088/1749-4699/8/1/014008, dated Jul. 2015, 24 pages.

Butakov, Nikita, "How to Build Robust Anomaly Detectors with Machine Learning", Ericsson, https://www.ericsson.com/en/blog/2020/4/anomaly-detection-with-machine-learning, dated Apr. 2020, 11 pages.

Caruana et al., "Ensemble Selection From Libraries of Models", in Proceedings of the 21st International Conference on Machine Learning, dated Jul. 2004, 8 pages.

Christoffel et al., "Class-prior Estimation for Learning from Positive and Unlabeled Data", Asian Conference on Machine Learning, PMLR, vol. 45, dated Feb. 2016, 16 pages.

De Souto et al., "Ranking and Selecting Clustering Algorithms using a Meta-Learning Approach", IEEE International Joint Conference on Neural Networks, dated Jun. 2008, 7 pages.

De Souza et al., "Improved Regression Models for Algorithm Configuration", in Proceedings of the Genetic and Evolutionary Computation Conference, DOI: 10.1145/3512290.3528750, dated Jul. 2022, 10 pages.

Doan et al., "Algorithm Selection using Performance and Run Time Behavior", International Conference on Artificial Intelligence: Methodology, Systems, and Applications, Lecture Notes in Computer Science, vol. 9883, dated Sep. 2016, 11 pages.

Doan et al., "Selecting Machine Learning Algorithms using Regression Models", IEEE International Conference on Data Mining Workshop, https://www.researchgate.net/publication/304298580, dated Nov. 2015, 8 pages.

Feurer et al., "Hyperparameter Optimization", in Automated Machine Learning, The Springer Series on Challenges in Machine Learning, DOI: 10.1007/978-3-030-05318-5_1, dated May 2019, 31 pages.

Guo et al., "A New Approach Towards the Combined Algorithm Selection and Hyper-parameter Optimization Problem", IEEE Symposium Series on Computational Intelligence, dated Dec. 2019, 57 pages.

Aldave et al., "Systematic Ensemble Learning for Regression", Machine Learning, DOI: 10.48550/arXiv.1403.7267 dated Mar. 2014, 38 pages.

Kuck et al., "Meta-Learning with Neural Networks and Landmarking for Forecasting Model Selection an Empirical Evaluation of Different Feature Sets Applied to Industry Data", International Joint Conference on Neural Networks, dated Jul. 2016, 8pgs.

Zhao et al., "Automatic Unsupervised Outlier Model Selection", in Advances in Neural Information Processing Systems, 34, dated 2021, 14 pages.

Molina et al., "Meta-Learning Approach for Automatic Parameter Tuning: A Case Study with Educational Datasets", Proceedings of the 5th International Conference on Educational Data Mining, dated Jun. 2012, 4 pages.

Perini et al., "Transferring the Contamination Factor between Anomaly Detection Domains by Shape Similarity", in Proceedings of the Thirty-Sixth AAAI Conference on Artificial Intelligence, vol. 36, No. 4, dated Jun. 2022, 9 pages.

Simpson et al, "Automatic Algorithm Selection in Computational Software using Machine Learning", 15th IEEE International Conference on Machine Learning and Applications, dated Dec. 2016, 10 pages.

Swierczewski et al., "Use the Built-in Amazon SageMaker Random Cut Forest Algorithm for Anomaly Detection", https://aws.amazon.com/blogs/machine-learning/use-the-built-in-amazon-sagemaker-random-cut-forest-algorithm- for-anomaly-detection/, Apr. 2018.

Wichard, J.D., "Model Selection in an Ensemble Framework", The 2013 International Joint Conference on Neural Networks, dated Jan. 1, 2006, pp. 2187-2192.

Wistuba et al., "Learning Hyperparameter Optimization Initializations", IEEE, 2015, 10 pages.

Wistuba et al., "Scalable Gaussian process-based transfer surrogates for hyperparameter optimization", Machine Learning, 107(1), 2017, 36 pages.

Xing, Tony, "Introducing Azure Anomaly Detector API", Microsoft, https://techcommunity.microsoft.com/t5/ai-customer-engineering-team/introducing-azure-anomaly-detector-api/ba-p/490162, dated Apr. 2019, 22 pages.

Xing, Tony, "Introducing Multivariate Anomaly Detection", Microsoft, https://techcommunity.microsoft.com/t5/ai-cognitive-services-blog/introducing-multivariate-anomaly-detection/ba-p/2260679, dated Apr. 2021, 9 pages.

Yakovlev et al., "Oracle AutoML: A Fast and Predictive AutoML Pipeline", in Proceedings of the VLDB Endowment, vol. 13, No. 12, DOI: https://doi.org/10.14778/3415478.3415542, dated Aug. 2020, 15 pages.

Kriegel at al., "Interpreting and Unifying Outlier Scores", in Proceedings of the 2011 SIAM International Conference on Data Mining, dated 2011, 12 pages.

Zhao, Yue, et al., "Towards Unsupervised HPO for Outlier Detection", https://arxiv.org/pdf/2208.11727.pdf, Aug. 24, 2022, 15pgs.

Yogatama et al., "Efficient transfer learning method for automatic hyperparameter tuning.", Artificial intelligence and statistics. PMLR, 2014, 9 pages.

Wistuba et al., "Learning hyperparameter optimization initializations." 2015 IEEE international conference on data science and advanced analytics (DSAA). IEEE, 2015.

Thornton et al., "Auto-WEKA: Combined selection and hyperparameter optimization of classification algorithms.", Proceedings of the 19th ACM SIGKDD international conference on Knowledge discovery and data mining. 2013.

Maher et al., "Smartml: A meta learning-based framework for automated selection and hyperparameter tuning for machine learning algorithms." EDBT: 22nd International conference on extending database technology. 2019.

Jomaa et al., "Dataset2vec: Learning dataset meta-features." Data Mining and Knowledge Discovery 35.3 (2021): 964-985.

Hutter et al., "Sequential model-based optimization for general algorithm configuration." International conference on learning and intelligent optimization. Berlin, Heidelberg: Springer Berlin Heidelberg, 2011.

Kim et al., "Learning to transfer initializations for bayesian hyperparameter optimization.", arXiv preprint arXiv:1710.06219, 2017.

Feurer et al., ; "Initializing bayesian hyperparameter optimization via meta-learning"; Proceedings of the AAAI conference on artificial intelligence. vol. 29. No. 1. 2015, 8 pages.

(56)                    References Cited

OTHER PUBLICATIONS

Bardenet et al., "Collaborative hyperparameter tuning." International conference on machine learning. PMLR, 2013, 9 pages.

* cited by examiner

FIG. 2

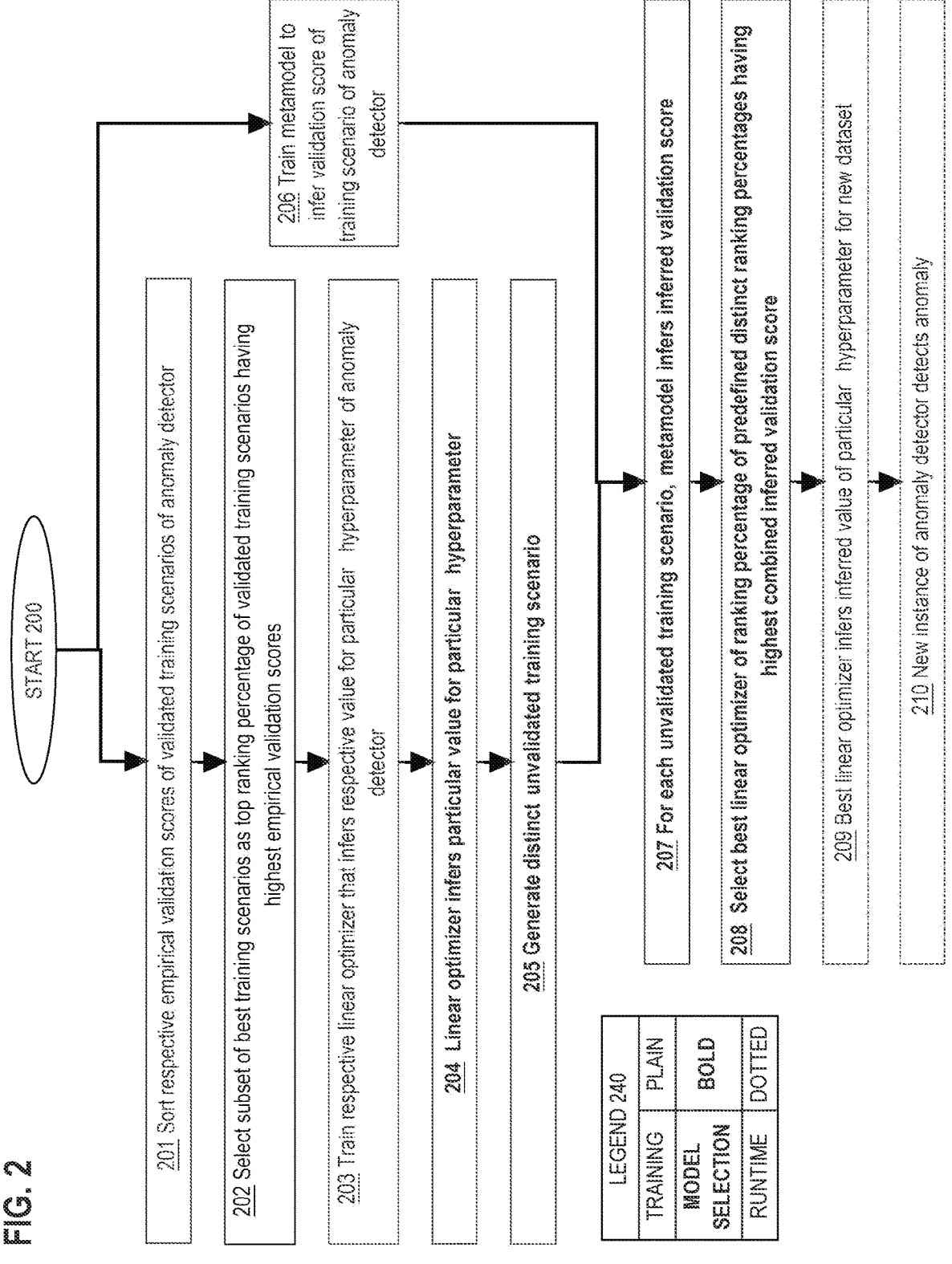

START 200

201 Sort respective empirical validation scores of validated training scenarios of anomaly detector 202 Select subset of best training scenarios as top ranking percentage of validated training scenarios having highest empirical validation scores 203 Train respective linear optimizer that infers respective value for particular hyperparameter of anomaly detector 204 Linear optimizer infers particular value for particular hyperparameter 205 Generate distinct unvalidated training scenario 206 Train metamodel to infer validation score of training scenario of anomaly detector 207 For each unvalidated training scenario, metamodel infers inferred validation score 208 Select best linear optimizer of ranking percentage of predefined distinct ranking percentages having highest combined inferred validation score 209 Best linear optimizer infers inferred value of particular hyperparameter for new dataset 210 New instance of anomaly detector detects anomaly

| LEGEND 240 | |
| --- | --- |
| TRAINING | PLAIN |
| MODEL SELECTION | BOLD |
| RUNTIME | DOTTED |

FIG. 3

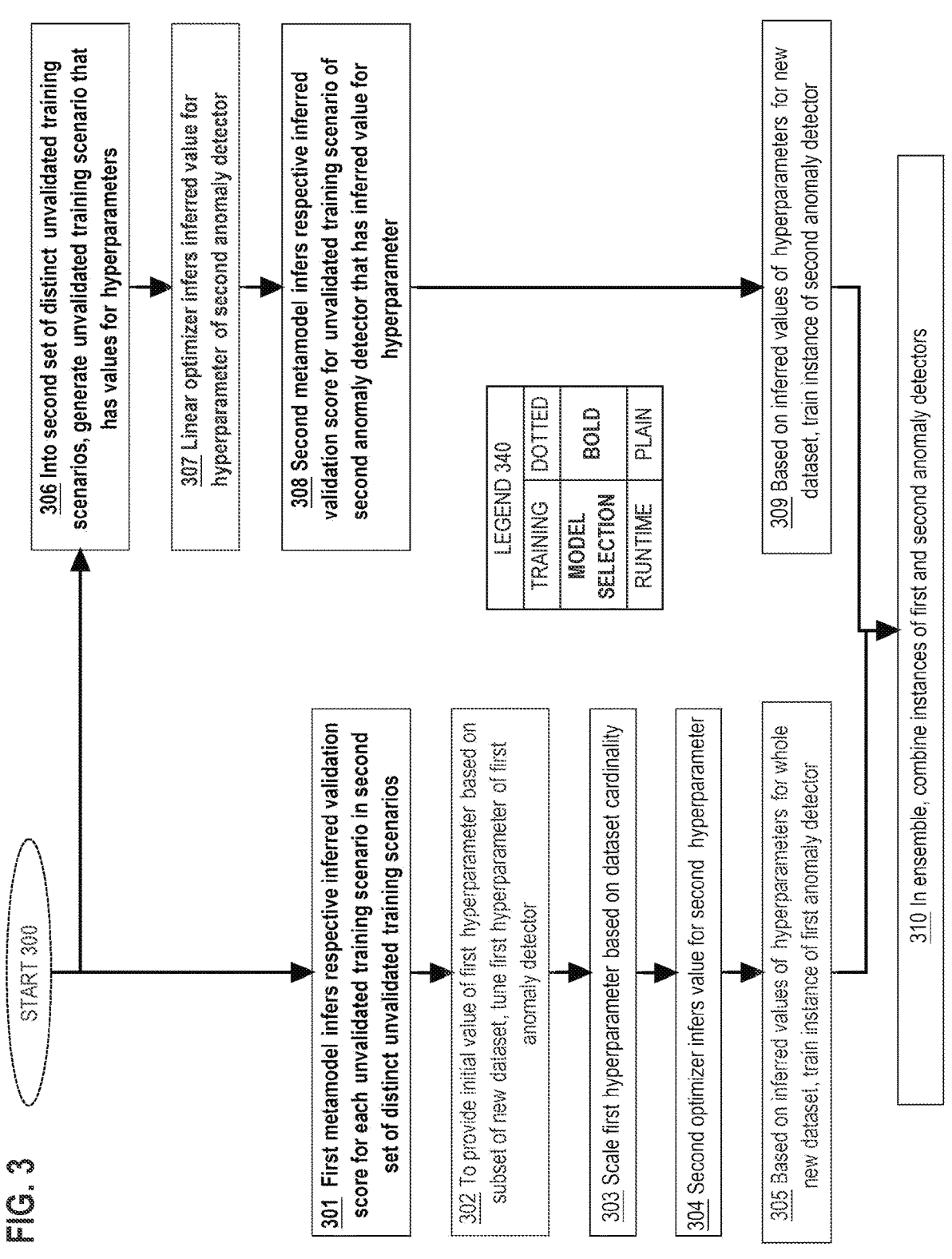

START 300

301 First metamodel infers respective inferred validation score for each unvalidated training scenario in second set of distinct unvalidated training scenarios 302 To provide initial value of first hyperparameter based on subset of new dataset, tune first hyperparameter of first anomaly detector 303 Scale first hyperparameter based on dataset cardinality 304 Second optimizer infers value for second hyperparameter 305 Based on inferred values of hyperparameters for whole new dataset, train instance of first anomaly detector 306 Into second set of distinct unvalidated training scenarios, generate unvalidated training scenario that has values for hyperparameters 307 Linear optimizer infers inferred value for hyperparameter of second anomaly detector 308 Second metamodel infers respective inferred validation score for unvalidated training scenario of second anomaly detector that has inferred value for hyperparameter 309 Based on inferred values of hyperparameters for new dataset, train instance of second anomaly detector 310 In ensemble, combine instances of first and second anomaly detectors

| LEGEND 340 | |
|---|---|
| TRAINING | DOTTED |
| MODEL SELECTION | BOLD |
| RUNTIME | PLAIN |

SOFTWARE SYSTEM 500

502

APPLICATION PROGRAM 1 — 502A

APPLICATION PROGRAM 2 — 502B

APPLICATION PROGRAM 3 — 502C

[...]

APPLICATION PROGRAM N — 502N

OPERATING SYSTEM
(e.g., WINDOWS, UNIX, LINUX, MAC OS, IOS, ANDROID, OR LIKE) — 510

GRAPHICAL USER INTERFACE (GUI) — 515

VIRTUAL MACHINE MONITOR (VMM) — 530

BARE HARDWARE (e.g., COMPUTING DEVICE 400)

LEARNING HYPER-PARAMETER SCALING MODELS FOR UNSUPERVISED ANOMALY DETECTION

BENEFIT CLAIM

This application claims the benefit of Provisional Appln. 63/408,602, filed Sep. 21, 2022, the entire contents of which is hereby incorporated by reference as if fully set forth herein, under 35 U.S.C. § 119(e).

FIELD OF THE INVENTION

The present invention relates to anomaly detector configuration for machine learning (ML). Herein is meta-learning for hyperparameter optimization for an anomaly detector that is domain neutral and highly reusable.

BACKGROUND

With the ever-growing amount of data, machine learning (ML) has been gaining traction, solving a multitude of problems previously thought unfeasible. ML with supervised training has been the focus of research and industry because it is easier than the unsupervised counterpart. Unsupervised anomaly detection (UAD) concerns itself with detecting unusual, rare, out-of-distribution datapoints without having access to a true set of labels.

ML models depend on various training factors such as training dataset and chosen hyperparameters values for an ML model. While most ML algorithms are accompanied by a set of default hyperparameters values, these do not enable the best performance of the respective model for every dataset. Few unsupervised approaches exist that allow the scoring of different models and model configurations.

Hyperparameters values have to be chosen specifically for each dataset. Greedy approaches to evaluation-based discovery of hyperparameters values is referred to as hyperparameter tuning, which leads to significant performance increases in the supervised case, where the available training labels allow for straightforward evaluation of hyperparameters. In UAD where labels are absent, obtaining a set of good default hyperparameter values is especially important and challenging, such as to utilize and evaluate multiple different target model classes whose hyperparameter tuning procedures are independent of each other.

The performance of a target ML model is highly dependent on the (e.g. huge) dataset. Target model configuration settings should be carefully chosen such as with hyperparameter tuning that is a computationally very expensive (i.e. slow) procedure and is heavily dependent on scoring (e.g. many) actual evaluations of the target model. Many techniques avoid such latency only by resorting to using the default provided hyperparameter values, which leaves major performance improvements unexploited.

BRIEF DESCRIPTION OF THE DRAWINGS

In the drawings:

FIG. 2 is a flow diagram that depicts an example process that a computer may perform, including meta-learning for hyperparameter optimization for an anomaly detector;

FIG. 3 is a flow diagram that depicts an example process that a computer may perform to optimize multiple hyperparameters of different kinds of anomaly detectors;

DETAILED DESCRIPTION

Figure 1:
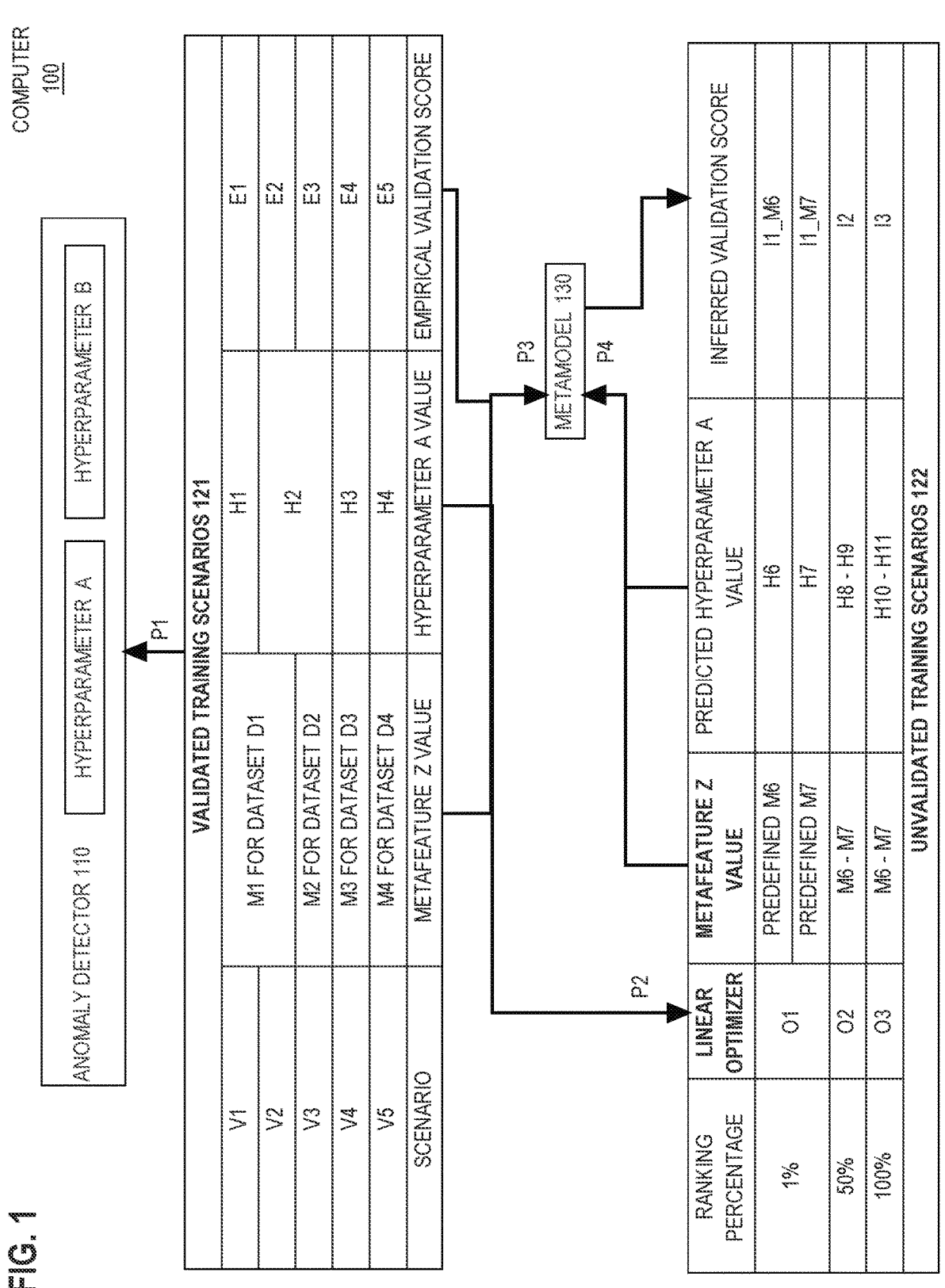
FIG. 1 is a block diagram that depicts an example computer that uses meta-learning for hyperparameter optimization for an anomaly detector that is domain neutral and highly reusable.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to anomaly detector configuration for machine learning (ML). Herein is meta-learning for hyperparameter optimization for an anomaly detector that is domain neutral and highly reusable. Using only metafeatures, this approach makes use of the dataset's descriptive (e.g. statistical) information in order to scale hyperparameters and select dataset-dependent default hyperparameters values. While designed with unsupervised anomaly detection (UAD) learning algorithms in mind, this approach generalizes to other (e.g. supervised) ML algorithms as well.

For a given hyperparameter of a training algorithm, various linear ML models are trained to predict the best hyperparameter value for a given dataset size. Scaling of the hyperparameters occurs by selecting the linear model that is predicted to have the best performance on a set of historical, labelled anomaly detection datasets. This not only allows the selection of hyperparameter values without having to conduct expensive hyperparameter tuning, but also benefits various ensemble-based models that make use of diverse kinds of constituent models.

In the domain of combinatorial optimization, an existing approach was designed for instance-specific algorithm configuration on a single dataset. Whereas, techniques herein use multiple (e.g. schematically and semantically diverse) datasets. The existing way only supports numeric hyperparameters and operates solely by interpolation. Given a new dataset, techniques herein predict, by extrapolation instead of interpolation, a set of hyperparameter values without having to train nor evaluate the target model in order to enable the fast utilization of various well-performing kinds of target model.

This approach is based on an intuition that selection of hyperparameter values needs to be done for each dataset separately, but is not an independent process. Knowledge about previous evaluations on similar datasets facilitate quantitatively better decisions in regards to which hyperparameters values perform better. This approach has at least the following novel aspects.

Can speed up hyperparameter tuning on a particular dataset, by accommodating the use of dataset sampling, while reducing the risk of overfitting to the smaller dataset size.

Can be used to predict high-quality default values for the hyperparameters of a target model, that take into account the size of the dataset.

From a technique perspective, both of the above novel aspects are based on a combination of the following strategies.

Fitting linear scaling models to the top X % of the data in order to learn good hyperparameter representations, for various values of X.

For acceleration, ranking several candidate scaling models using a metamodel that predicts the quality of the scaling model as a surrogate, instead of empirically evaluating the configurations by training the target model on actual datasets.

This approach has at least the following advantages.

Is able to predict hyperparameters values without access to ground-truth labels of a new dataset.

Automates selection of a high-quality hyperparameter value when given a larger (e.g. entirety) portion of a same dataset.

Generalizes across different domains, by being trained on a diverse set of datasets.

Is able to select good hyperparameters dependent on dataset size.

Automates choosing good hyperparameters for multiple model classes (i.e. kinds), which makes building good ensembles much faster.

Can be applied using a collection of historical hyperparameter configuration performance data, provided that users already have such data logged from previous experiments, thereby skipping the large computational cost required for generating lots of performance data from scratch.

In an embodiment, a computer sorts empirical validation scores of validated training scenarios of an anomaly detector. Each validated training scenario has a training dataset to train an instance of the anomaly detector that is configured with values for hyperparameters of the anomaly detector. Each training dataset has values for a set of metafeatures. For each ranking percentage of predefined distinct ranking percentages, a subset of best training scenarios is selected that consists of the ranking percentage of validated training scenarios having the highest empirical validation scores. A linear optimizer trains to infer a value for a hyperparameter. The training is based on the values of the metafeatures of the training datasets of the subset of best training scenarios and the empirical validation scores of the subset of best training scenarios. For each set of metafeatures values in many unvalidated sets of metafeatures values that do not correspond to an actual dataset, the linear optimizer infers a value for the hyperparameter. Into many distinct unvalidated training scenarios, a distinct unvalidated training scenario of the anomaly detector is generated that has metafeatures values and values for the hyperparameters that contains the inferred value for that hyperparameter. For each unvalidated training scenario, a respective inferred validation score is inferred. A best linear optimizer is selected having a highest combined inferred validation score based on the inferred validation scores for the unvalidated training scenarios. For a new dataset, the best linear optimizer infers a value of that hyperparameter. An anomaly is detected by a new instance of the anomaly detector that is based on the inferred value of that hyperparameter.

1.0 Example Computer

FIG. 1 is a block diagram that depicts an example computer 100. In an embodiment, computer 100 uses metalearning for hyperparameter optimization for anomaly detector 110 that is domain neutral and highly reusable.

Computer 100 may be one or more of a rack server such as a blade, a personal computer, a mainframe, or a virtual computer.

1.1 Anomaly Detector

Anomaly detector 110 is a reusable machine learning (ML) algorithm that can be repeatedly instantiated to generate configurable and operative anomaly detector instances (not shown). For example, one instance of anomaly detector 110 may be configured and trained to detect an anomalous network packet. Another instance of anomaly detector 110 may instead be configured and trained to detect an anomalous photograph.

As hosted and operated by a computer such as computer 100, an instance of anomaly detector 110 accepts a feature vector (not shown) as input and generates an inference as output. Depending on the embodiment, the inference may be a binary class (i.e. anomalous or non-anomalous) or a numeric anomaly score that can be compared to a predefined anomaly threshold to derive the binary class. The feature vector is an encoding of the features (e.g. data fields) of an object to be analyzed, such as a network packet. The width (i.e. feature count) of the feature vector depends on the domain. For example, the width and schema of a network packet feature vector may be different from that of a photograph feature vector.

1.2 Hyperparameters

Anomaly detector 110 has multiple adjustable hyperparameters A-B that customize the configuration of the internal structure of each instance of anomaly detector 110. For example, two instances of anomaly detector 110 may have same or different values of hyperparameter A. Even if both instances have identical values for all of hyperparameters A-B, both instances may nonetheless be internally and operationally distinct if they were differently trained (e.g. with different training datasets).

Hyperparameters A-B may have same or different datatypes, such as a continuous number with a respective value range or a category that has a set of (e.g. mutually exclusive) symbolic (i.e. non-numeric) values. Each of hyperparameters A-B contributes a respective dimension to a multidimensional configuration space of anomaly detector 110 that may be so vast that exhaustive exploration is intractable.

1.3 Validated Training Scenarios

Before operation of computer 100, an enterprise may or may not have accumulated an archive of training history of many different instances of anomaly detector 110. The archive may be stored for access by computer 100 in console log files or a database. For each respective training of many individual instances of anomaly detector 110, the archive contains a respective metadata record that indicates details about a respective one of validated training scenarios 121. In other words, the archive contains validated training scenarios 121 or, if the archive instead is empty, then datasets D1-D4 should be used to train various instances of anomaly detector 110 with various values for hyperparameters A-B to generate validated training scenarios 121.

Validated training scenarios 121 contains individual validated training scenarios V1-V5 that each uses a respective training dataset (i.e. training corpus). In various embodiments, each log entry in a console log file or each database record represents a respective object such as a network packet. For example, each row in a database table may store or represent a network packet. Such object representations are referred to herein as tuples, each of which is or is readily encoded into a feature vector.

1.4 Diversity of Training Datasets

Herein, diversity of training data means that two training datasets may store respective sets of tuples that respectively represent a same or different respective kind of object. For example, dataset D1 may represent network packets; dataset D2 may represent photographs; and datasets D3-D4 may represent logic statements. However, tuples for different kinds of objects are not comingled in a same dataset. Thus, each dataset is individually homogeneous.

Other examples of kinds of objects represented in datasets include a communicated message, a log entry, a logic statement, a semi-structured document such as JavaScript object notation (JSON) or extensible markup language (XML), a photograph or computer generated image, a database record or spreadsheet row, a logical graph, and a parse tree such as an abstract syntax tree (AST). Diversity of training data herein means that an instance of an anomaly detector may be specialized for one kind of object but counterintuitively with hyperparameter values that are optimized herein based on datasets that contain other kinds of objects. For example, a photograph anomaly detector may have hyperparameters optimized based on metafeatures of non-graphic datasets such as a network packet dataset, and vice versa for optimally configuring a network packet anomaly detector based on photo dataset(s).

1.5 Neutral Metafeatures

Each of validated training scenarios V1-V5 has a respective training dataset that may or may not be distinct. For example, validated training scenarios V1-V2 share training dataset D1, but validated training scenarios V3-V5 each have their own respective distinct training datasets D2-D4 as shown in the metafeature Z value column of validated training scenarios 121. Although the respective dimensionality, schema, and full set of metafeatures of each of datasets D1-D4 may or may not be distinct due to domain or application specifics, nonetheless there are various statistical and information theoretic metafeatures that may be derived from each of datasets D1-D4 regardless of dimensionality and schema of those datasets.

In other words, validated training scenarios 121 may contain values for multiple metafeatures that are domain and application neutral, such as example metafeature Z. For example, metafeature Z may be the cardinality (i.e. tuple count) of a dataset. In that case, values M1-M2 are a same or different values depending on whether or not respective datasets D1-D2 have a same cardinality.

Historical (e.g. manual) tuning may have provided same or different values of hyperparameter A respectively for different domains, applications, and/or training datasets. For example, validated training scenarios V2-V3 share value H2 for hyperparameter A, but validated training scenarios V1 and V4-V5 each have their own respective distinct value H1 or H3-H4 for hyperparameter A as shown in the hyperparameter A value column of validated training scenarios 121. Most or all of validated training scenarios 121 are distinct combinations of a dataset and values for hyperparameters A-B, and each dataset may have its own values for neutral (i.e. in common to all datasets D1-D4 that are in different domains) metafeatures such as metafeature Z.

1.6 Validation Scoring

All of training scenarios 121 are already or readily are validated (e.g. by computer 100 or another computer), which means that each of validated training scenarios 121 has a respective instance (not shown) of anomaly detector 110 that is or was configured, trained, and tested (i.e. validated) with values of hyperparameters A-B as indicated in each training scenario and configured to accept a respective feature vector whose format (i.e. width and schema) matches the dataset of the training scenario. For example if datasets D3-D4 do or do not both contain tuples of network packets, then respective validated training scenarios V4-V5 do or do not share a same feature vector format.

Whether validated or not, a training scenario should contain values of neutral metafeatures and values of hyperparameters A-B. A validated training scenario should also contain an empirical validation score that is numeric and that was actually achieved and empirically measured by testing the scenario's instance of anomaly detector 110, which also entails training the instance if it was not yet trained. For example, validated training scenarios V1-V2 were both trained with dataset D1, but the anomaly detector instance of scenario V1 is better (i.e. more accurate) than the anomaly detector instance of scenario V2 only if empirical validation score E1 is higher than score E2.

1.7 Computer Lifecycle

Operation of computer 100 occurs in two stages, which are a design stage and runtime. Each of the two stages has one or more phases. In this example, the design stage has phases P2-P4.

Preparatory phase P1 occurs before the design stage and entails executing all of validated training scenarios 121, which may have already occurred (e.g. without computer 100) and been archived as history. Phase P1 entails configuring a respective instance of anomaly detector 110 with values of hyperparameters A-B as specified in each of scenarios V1-V5. Phase P1 also entails training, testing, and measuring a respective empirical validation score. The purpose of phase P1 is to fully populate every row and column of validated training scenarios 121.

1.8 Linear Optimizers

Immediately or eventually after phase P1, the design stage performs phases P2-P3 that may occur in either ordering or concurrently. For example, either of phases P2-P3 may start first, and either may finish first. In some cases, phases P2-P3 may simultaneously start and/or simultaneously finish. In this example, phase P2 occurs before phase P3.

Phase P2 generates and trains linear optimizers O1-O3 that each learns to predict (i.e. infer) a best value for hyperparameter A depending on value(s) of some or all of the neutral metafeatures of a dataset. The best value of a hyperparameter is the value with which an instance of anomaly detector 110 may achieve a highest validation score with that dataset. Implementations of linear optimizers O1-O3 are discussed later herein.

Phase P2 uses validated training scenarios 121 as training metadata for meta-learning training of linear optimizers O1-O3. Phase P2 uses each of validated training scenarios V1-V5 as a separate tuple for training none, some, or all of linear optimizers O1-O3. The empirical validation score of each of validated training scenarios V1-V5 is used as a training label, and training of linear optimizers O1-O3 is supervised.

All of linear optimizers O1-O3 accept a same feature vector format that contains values from validated training scenarios 121 but only for (e.g. some or all) the neutral metafeatures such as metafeature Z. In other words, phase P2 accesses, in validated training scenarios 121, only the metafeature column(s) and, for supervision, the empirical validation score column.

For example so long as the metafeature column(s) and empirical validation score column are already populated in validated training scenarios 121, then phase P2 does not need datasets D1-D4 and does not need the instances of anomaly detector 110 that performed validated training scenarios V1-V5. For example when phase P2 occurs, datasets D1-D4 and those anomaly detector instances might no longer exist. Hyperparameter column(s) in validated training scenarios 121 are unused during phase P2.

1.9 Top Ranking Percentage of Empirical Validation Scores

Phase P2 initially identically configures linear optimizers O1-O3, but then trains them with different respective nested subsets of validated training scenarios 121. For example, linear optimizer O3 trains with a superset of the validated training scenarios that linear optimizer O2 trains with. Likewise, linear optimizer O2 trains with a superset of the validated training scenarios that linear optimizer O1 trains with.

For example as shown in the ranking percentage column of unvalidated training scenarios 122, linear optimizer O1 trains with only the subset of validated training scenarios 121 that have the highest one percent of empirical validation scores. Likewise, optimizer O2 trains with only the subset of validated training scenarios 121 that have the highest fifty percent of empirical validation scores.

In an embodiment, values in the ranking percentage column are provided by a predefined sequence of distinct percentages. In various embodiments, the predefined sequence contains some or all of: a subsequence that increases by one and a subsequence that increases by five or ten. An example predefined sequence is 1%, 2%, 3%, 4%, 5%, 10%, 15%, 20%, 25%, 30%, 35%, 40%, 50%, 60%, 70%, 80%, 90%, and 100%. In another example, all values in the predefined sequence are separated by a same fixed interval (e.g. 10%).

Within the metafeature Z value column, predicted hyperparameter A value column, and inferred validation score column in unvalidated training scenarios 122 are shown values I1_M6-I1_M7, I2-I3, H6-H11, and M6-M7 that are demonstrative individual values or value subsets not explained until discussion of model selection facilitation by step 205 in FIG. 2 later herein. For demonstration, some rows of unvalidated training scenarios 122 are shown combined or not shown as discussed later herein.

1.10 Metamodel

The purpose of phase P2 is meta-learning by training linear optimizers O1-O3. After phase P2, already trained linear optimizers O1-O3 may be immutable and used only for prediction (i.e. inferencing).

Also during computer 100's training stage, phase P3 meta-learns by instead training metamodel 130 using validated training scenarios V1-V5 as training tuples. Metamodel 130 may be any trainable (e.g. linear or non-linear) regression model such as ML architectures discussed later herein. Depending on the embodiment, metamodel 130 is or is not an artificial neural network (ANN).

Metamodel 130 accepts a feature vector format that contains only values as recorded in validated training scenarios 121 for: some or all of the neutral metafeatures such as metafeature Z and some or all of hyperparameters A-B. In other words, phase P3 accesses, in validated training scenarios 121, only the metafeature column(s), the hyperparameters columns and, for supervision, the empirical validation score column.

So long as the metafeature column(s), the hyperparameters columns, and the empirical validation score column are already populated in validated training scenarios 121, then phase P3 does not need datasets D1-D4 and does not need the instances of anomaly detector 110 that performed validated training scenarios V1-V5. For example when phase P3 occurs, datasets D1-D4 and those anomaly detector instances might no longer exist. After phase P3, already trained metamodel 130 may be immutable and used only for prediction (i.e. inferencing).

1.11 Model Selection

Model selection entails detecting which of linear optimizers O1-O3 should predict the best value of hyperparameter A for anomaly detector 110. One of the ways that computer 100 can optimize hyperparameter A for the new training dataset is implemented in the following scaling embodiment.

In a scaling embodiment, some or all of linear optimizers O1-O3 accept a feature vector format that consists of a single feature that is only one of the neutral metafeatures, such as metafeature Z that may or may not be dataset cardinality. For example, each of linear optimizers O1-O3 may be a linear regression model that consists of a single term that is a multiplicative product of a value of the neutral metafeature times a learned scaling coefficient. For example, each of linear optimizers O1-O3 may have learned a distinct respective scaling coefficient.

In other words in a scaling embodiment, linear optimizers O1-O3 may differ only by degree of linear (i.e. monotonic) scaling. In that case, model selection in phase P4 determines scale (i.e. causes scaling selection) for a hyperparameter. For example, anomaly detector 110 may implement K nearest neighbors (KNN) clustering, and hyperparameter A may be neighbor count K for KNN. In that case, the value of K (i.e. hyperparameter A) should scale directly proportional to dataset cardinality. Scaling is further discussed later herein.

2.0 Example Metalearning Process

FIG. 2 is a flow diagram that depicts an example process that computer 100 may perform, including meta-learning for hyperparameter optimization for anomaly detector 110. FIG. 2 is discussed with reference to FIG. 1.

Start 200 corresponds to phase P1 in FIG. 1. Depending on the situation, start 200 is or is not optional. As explained earlier herein, an archive of empirical performance history of anomaly detector 110 may or may not already be available. If the archive does not yet exist, start 200 populates the archive with empirical performance data of anomaly detector 110 as explained earlier herein.

As explained earlier herein, operation of computer 100 occurs in two stages, which are a design stage that entails steps 201-208 and runtime that entails steps 209-210. After start 200, the design stage occurs to process validated training scenarios 121 that may or may not contain scenarios that specify some or all of: an unlabeled training dataset, for two scenarios, two respective training datasets that have distinct respective dimensionalities and, for two scenarios, two respective training datasets that have respective distinct sets of metafeatures that both include a common (i.e. shared) subset of metafeatures, such as metafeature Z.

The design stage has a sequence of two substages that are training that entails steps 201-203 and 206 and then model selection that entails steps 204-205 and 207-208. These stages and substages are shown in demonstrative legend 240 that is not actually operated or stored by computer 100.

As shown, processing after start 200 bifurcates into left and right vertical control flows that (e.g. concurrently) perform two respective examples of metalearning. The left flow consists of steps 201-205 in which linear optimizers O1-O3 metalearn.

As explained earlier herein, each of linear optimizers O1-O3 trains with a respective nested best subset of validated training scenarios 121 having a highest respective ranking percentage of empirical validation scores. Step 201 ranks (i.e. sorts) empirical validation scores of validated training scenarios 121. For each of linear optimizers O1-O3, step 202 selects a respective subset of best training scenarios as a respective top ranking percentage of validated training scenarios 121 having the highest empirical validation scores.

Step 203 supervised trains each of linear optimizers O1-O3 to infer a value for hyperparameter A as explained earlier and later herein. After step 203, already trained linear optimizers O1-O3 may be treated as immutable and used for inference only. In other words per legend 240, step 203 is in the training substage of the design stage, but next step 204 instead is in the model selection substage of the design stage.

Steps 204-205 cooperate to generate exploratory (i.e. new) unvalidated training scenarios 122 that may be more or less hypothetical scenarios: a) whose training datasets need not actually exist nor be identified so long as values of some or all neutral metafeatures are provided, including metafeature Z that may or may not be dataset cardinality and that b) need not actually occur and need not have empirical validation scores. In step 204 each of linear optimizers O1-O3 infers a respective particular value for hyperparameter A as explained earlier and later herein.

Step 205 generates distinct unvalidated training scenarios 122, including respective inferred values for hyperparameter A as inferred by previous step 204. For demonstration in FIG. 1, some rows of unvalidated training scenarios 122 are shown combined or not shown as follows.

Column headers are shown in bold for two columns that are the linear optimizer column and the metafeature Z value column. Those two columns together store a distinct values combination in each row of unvalidated training scenarios 122. For each of linear optimizers O1-O3, there are respective many (shown or unshown) rows in unvalidated training scenarios 122.

For example, each row for linear optimizer O1 contains a distinct predefined value of metafeature Z. Those same distinct predefined values for linear optimizer O1 are repeated in the metafeature Z value column for each of linear optimizers O1-O3. For example, all linear optimizers O1-O3 show repeated predefined value M6 in the metafeature Z value column.

For example for predefined value M6, linear optimizer O1 infers that the value of hyperparameter A should be value H5. Thus, the scenario shown in the top row of unvalidated training scenarios 122 indicates values H5 and M6 for linear optimizer O1. Step 205 generates shown and unshown rows of unvalidated training scenarios 122 based on exhaustive combinations between a predefined set of (e.g. 100 evenly spaced) values for metafeature Z and three linear optimizers O1-O3.

For example, 3 optimizers×100 metafeature Z values=300 rows in unvalidated training scenarios 122, which is 100 rows per linear optimizer. If linear optimizers O1-O3 instead expect values for two metafeatures that both have 100 evenly spaced grid values, then unvalidated training scenarios 122 contains 3×100×100=30,000 rows.

Steps 203 and 206 are shown above step 204 to indicate that steps 203 and 206 (e.g. concurrently) occur in the training substage, which does not mean that step 206 should occur before step 204. In various examples, step 206 may finish before step 201 begins; step 206 may begin after step 205 finishes; and/or step 206 may occur concurrent to some or all of steps 201-205.

Step 206 supervised trains metamodel 130 to infer a validation score of a training scenario of anomaly detector 110 as discussed earlier and later herein. After step 206, already trained metamodel 130 may be treated as immutable and used for inference only. Although the model selection substage of the design stage begins with step 204, later step 207 does not occur until steps 205-206 finish.

In step 207, for each of unvalidated training scenarios 122, metamodel 130 infers a respective inferred validation score as discussed earlier and later herein. For demonstration in FIG. 1, some rows of unvalidated training scenarios 122 are shown combined or not shown as follows. Predefined values H6-H7 and M6-M7 are shown in the top two rows in unvalidated training scenarios 122. For those two scenarios, metamodel 130 in step 207 infers respective inferred validation scores I1_M6-I1_M7.

For linear optimizers O2-O3, corresponding rows in unvalidated training scenarios 122 are instead shown as combined (i.e. rolled up) to demonstrate that all of the rows of one linear optimizer may be combined based on arithmetic averaging by step 208. For example, inferred validation score I2 or I3 demonstratively represents an arithmetic average of inferred validation scores of all scenarios for a respective linear optimizer O2 or O3. For example, the average for linear optimizer O1 would be an average of inferred validation scores I1_M6-I1_M7.

Step 208 performs model selection by selecting a best linear optimizer of a ranking percentage of predefined distinct ranking percentages having a highest combined inferred validation score. For example if average inferred validation score I2 is the highest average of all linear optimizers O1-O3, then step 207 selects linear optimizer O2 as the best optimizer for hyperparameter A.

After step 208, unselected linear optimizers O1 and O3 may be discarded. A (e.g. long) duration may separate steps 208-209 that may occur in a same or different computer. For example, design stage steps 201-208 may occur in a laboratory environment and runtime steps 209-210 may or may not instead occur in a production environment.

In step 209, best linear optimizer O2 infers an inferred value of hyperparameter A for a new (e.g. unlabeled) dataset that may have a value for metafeature Z that does or does not occur in training scenarios 121-122. A new instance of anomaly detector 110 may be configured with the value of hyperparameter A that was inferred in step 209. During subsequent training, validating, or production inferencing, the new instance of anomaly detector 110 detects an anomaly in step 210.

3.0 Example Target Model Optimization Process

FIGS. 1-2 emphasize first metamodel 130 for optimizer model selection for first hyperparameter A of first anomaly detector 110, which may be a minimal use case. FIG. 3 is a flow diagram that depicts an example process that computer 100 may perform instead with some or all of: a) a second set of linear optimizers for second hyperparameter B of first anomaly detector 110, b) a second metamodel and second set of linear optimizers for a hyperparameter of a second anomaly detector, and c) an ensemble that contains instances of both anomaly detectors. Some or all of the steps of FIGS. 2-3 may be complementary and combined or interleaved. FIG. 3 is discussed with reference to FIGS. 1-2.

Similar to start 200 of FIG. 2, start 300 generates or obtains first validated training scenarios 121 for first anomaly detector 110, including empirical validation scores as discussed earlier herein. Because FIG. 3 entails a second anomaly detector, start 300 also generates or obtains second validated training scenarios with empirical validation scores for the second anomaly detector. The first and second validated training scenarios may or may not share some or all of datasets D1-D4. In any case, the first and second validated training scenarios should have some or all neutral metafeatures in common, such as metafeature Z. The first and second validated training scenarios may or may not share hyperparameters, depending on whether or not the first and second anomaly detectors have a same set of hyperparameters.

Unlike start 200 that only occurs before the training substage, start 300 also performs the entire training substage of the design stage that, in this example, entails training first set of linear optimizers O1-O3 and first metamodel 130 as discussed earlier herein. Because FIG. 3 entails optimizing second hyperparameter B of first anomaly detector 110, start 300 also trains a second set of linear optimizers for hyperparameter B. Because FIG. 3 entails a second anomaly detector, start 300 also trains a second metamodel and an additional set of linear optimizers for a hyperparameter of the second anomaly detector. To indicate that start 300 also performs the entire training substage, start 300 is shown with a dashed outline per legend 340 that is not the same as legend 240 of FIG. 2.

After start 300, the model selection substage of the design stage is ready to begin. Per legend 340, steps 301 and 306-308 are shown bold to indicate that they occur during the model selection substage of the design stage discussed earlier herein.

Similar to start 200, start 300 is followed by two (e.g. concurrent) vertical control flows. The left flow contains steps 301-305. The right flow contains steps 306-309. The respective shown vertical spacing between steps in either flow demonstrates a logical progression of substages but does not represent timing. For example, the shown large space between steps 308-309 indicates neither duration nor ordering. For example, step 309 does not wait to start based on step 304 or 305. Likewise, the shown horizontal alignment of steps 301 and 308 does not imply simultaneity, but instead indicates that they occur in a same logical substage that entails training of respective metamodels.

In particular, the left flow uses first anomaly detector 110 and first metamodel 130. Likewise, the right flow uses the second anomaly detector and the second metamodel. Because techniques herein have target model (i.e. anomaly detector) neutrality, these techniques are directly reusable for both left and right flows. The left and right flows demonstratively show different steps to showcase different aspects and capabilities with anecdotal examples, which does not mean that the right and left flows are differently specialized nor actually have different steps.

Although not shown as such, the left and right flows may be identical flows with identical steps but with different respective data and target model. For example, some steps only shown in the left flow are dedicated to second hyperparameter B to demonstrate that multiple hyperparameters of a same anomaly detector can be optimized, but that does not mean that the second anomaly detector cannot also have multiple hyperparameters optimized in a same way, even though corresponding steps are not shown in the right flow.

The left and right flows each generates a respective set of unvalidated training scenarios to be scored by a respective metamodel. For the left flow, unvalidated training scenarios generation occurs between steps 300-301 as discussed earlier herein. Model selection of a best linear optimizer for second hyperparameter B entails step 301. Different hyperparameters of a same anomaly detector should not generate and use a same set of distinct unvalidated training scenarios for model selection. Instead, a separate set of distinct unvalidated training scenarios should be generated and used for selecting the respective best linear optimizer of each hyperparameter.

In an embodiment, hyperparameter B is categorical (i.e. non-numeric), and the optimizers of hyperparameter B are logistic regressions instead of linear regressions.

In step 301, first metamodel 130 infers a respective inferred validation score for each unvalidated training scenario in a respective first or second set of distinct unvalidated training scenarios. Step 301 is repeated for each hyperparameter A-B with a respective separate set of distinct unvalidated training scenarios for each hyperparameter. Unlike unvalidated scenarios during the model selection substage, all hyperparameters A-B of anomaly detector 110 may share validated training scenarios 121 during the training substage in step 300. Step 301 also performs any remaining activities of the model selection substage for hyperparameters A-B. For example when step 301 finishes, a respective best linear optimizer is already selected for each of hyperparameters A-B.

An arbitrarily long duration may elapse between the design stage (e.g. steps 301 and 308) and runtime (e.g. steps 302 and 309) as explained earlier herein. Runtime may be caused by a need to train respective instances of the first and second anomaly detectors for a new training dataset. For example, runtime may entail retraining (e.g. due to data drift) both anomaly detectors with a new training dataset that contains more recent training than previous instances of the anomaly detectors were trained with.

In a scaling embodiment discussed earlier herein, linear optimizers for a same hyperparameter may differ only by degree of scaling. A neutral metafeature (e.g. metafeature Z such as dataset cardinality) may be input that causes a linear optimizer to scale a hyperparameter, and that linear optimizer may have either of two embodiments that are: a) a default embodiment that scales a built-in default value of the hyperparameter and b) an upscaling embodiment whose input includes: i) a (e.g. small) initial value of the hyperparameter to be upscaled and ii) a (e.g. small) initial value of the neutral metafeature (e.g. dataset cardinality).

To provide an optimal initial value of first hyperparameter A based on a small subset of training items (e.g. rows or tuples) in a new training dataset, step 302 initially tunes first hyperparameter A. For example, to discover an optimal initial value of hyperparameter A for the new training dataset, intensive (i.e. slow) initial tuning (e.g. HyperOpt) of hyperparameter A may use a small (i.e. fast, low dataset cardinality, e.g. low value of metafeature Z) subset of the training items in the new training dataset.

After an optimal initial value of hyperparameter A is automatically discovered for a (e.g. randomly sampled without replacement) small portion of the new training dataset, then a rescaling (e.g. upscaling) linear optimizer may quickly (e.g. in constant time) rescale hyperparameter A for the (e.g. huge) entirety of the new training dataset. The rescaling linear optimizer may accept as input: the initial value of metafeature Z for the small subset of the new dataset, the (e.g. bigger) value of metafeature Z for the whole new dataset, and the initial value of hyperparameter A. Based on that input, the rescaling linear optimizer may infer an optimal value of hyperparameter A for the whole new dataset. For example, step 303 may rescale first hyperparameter A based on cardinality of the whole new dataset.

As explained above, earlier step 301 selected a respective best linear optimizer for each of hyperparameters A-B. In step 303, the best linear optimizer for first hyperparameter A infers a scaled value for first hyperparameter A. In step 304 the best linear optimizer for second hyperparameter B infers a value for second hyperparameter B.

Based on inferred (e.g. scaled) values of hyperparameters A-B for the whole new dataset that has a larger cardinality (i.e. metafeature Z) than the small subset of the new dataset, step 305 configures and intensively trains a new instance of first anomaly detector 110.

As explained earlier herein, the left and right control flows each have a respective metamodel. With emphasis on other aspects of techniques herein, the right control flow shows different steps than the left flow that, as explained earlier herein, means that both flows may actually have unshown additional steps such as the steps of the other flow. For example, special techniques for a second metamodel and its metalearning dataset, as shown in the right flow, may also occur with corresponding first metamodel 130 in the left flow.

The left and right control flows may share datasets D1-D4 that have metafeature Z. However, the left and right flows have separate (i.e. do not share) training scenarios. For example, step 301 in the left flow and step 306 in the right flow are both shown as using a set of unvalidated training scenarios, which should be a separate respective set for each of steps 301 and 306.

As explained above, earlier step 301 selected a respective best linear optimizer for hyperparameters A-B of first anomaly detector 110. For similar model selection instead for the second anomaly detector, steps 306-308 cooperate in the right flow as follows.

Step 306 uses already trained linear optimizers of a hyperparameter of the second anomaly detector. Into a set of distinct unvalidated training scenarios that only regard the second anomaly detector, step 306 generates various unvalidated training scenarios that contain: values for various hyperparameters of the second anomaly detector as inferred (e.g. scaled) in step 306 and values of various neutral metafeatures (including metafeature Z). A sub-step of step 306 is step 307 in which, for each of the unvalidated training scenarios, each of that hyperparameter's linear optimizers infers a respective inferred value for that hyperparameter. Each hyperparameter value inferred in step 307 is stored in a respective one of the unvalidated training scenarios for the hyperparameter.

In step 307, the second metamodel infers a respective inferred validation score for each unvalidated training scenario of the second anomaly detector. The linear optimizer for the hyperparameter with the highest average inferred validation score is selected as the best linear optimizer for the hyperparameter.

In a similar way as discussed earlier herein for hyperparameters A-B of first anomaly detector 110, multiple hyperparameters of the second anomaly detector may have optimal values inferred by respective linear optimizers. Based on inferred values of hyperparameters for a new dataset (e.g. the new dataset of step 305), step 309 configures and trains a new instance of the second anomaly detector.

Thus after the left and right control flows complete by finishing respective steps 305 and 309, instances of the first and second anomaly detectors are already intensively trained with the new dataset. Into an ensemble, step 310 combines instances of the first and second anomaly detectors. The ensemble may have various ways of combining inferences by instances of one or both anomaly detectors for a same input such as averaging both anomaly scores to calculate a combined anomaly score.

4.0 First Exemplary Embodiment

The following first exemplary embodiment may incorporate aspects of embodiments presented earlier herein. Design choices in this exemplary embodiment are demonstrative and do not limit the earlier embodiments.

The following procedure contains the following steps 1-4 that train hyperparameter scaling models (i.e. optimizers) for each hyperparameter of a single target machine learning (ML) model.

1. Large Scale Configuration Evaluation to Collect a Meta-Dataset (i.e. of training scenarios): In order to learn hyperparameter scaling, a large collection of hyperparameter configurations are evaluated (i.e. validation scored) to provide information about their performance on various dataset sizes. This collection of data mapping hyperparameter configurations and dataset sizes to scores is the meta-dataset (i.e. of training scenarios), which is used in subsequent steps 2-3. The meta-dataset contains one column for each hyperparameter, one column for the size of the dataset, and one supervised training target column that is the validation score that was obtained using the given hyperparameter configuration for the given dataset size. Each row corresponds to the data from a particular hyperparameter configuration that was evaluated on a particular dataset and dataset size. Some users may already have a large amount of configuration performance data from logs of previous hyperparameter tuning runs that they have already performed on several old datasets. In these cases, provided that their old datasets have sufficient diversity in size, users may be able to skip this step 1 by collating all of this old log data into a single meta-dataset, thereby skipping the dominating portion of the computation cost of this procedure.

2. Training a Surrogate Model (i.e. metamodel) to Predict Hyper-parameter Quality: Based on this evaluated meta-dataset, a metamodel is trained to predict the average score of a target model with a given hyperparameter configuration on a given dataset size. This can be done by taking all of the data in the meta-dataset, setting the score as the training target, and then passing all of this data into an ML pipeline. The ML pipeline then outputs a fitted metamodel, that can be used to predict the score of a candidate hyperparameter configuration on a given dataset size.

3. Fitting Hyperparameter Scaling Models (i.e. optimizers): Learn how each hyperparameter of the target model should scale as a function of the dataset size. For a given dataset size, each hyperparameter scaling model predicts the value that should be used for a particular hyperparameter. While any ML model can be used as an optimizer in step 3, either of two models are best due to their simplicity: a linear regression model (in the case of a numeric hyperparameter), or a logistic regression model (in the case of a categorical hyperparameter). The reason for this is to avoid overfitting because more powerful models are more likely to infer (i.e. extrapolate or interpolate) hyperparameter values that are outside of the range of reasonable values for a neutral metafeature (e.g. dataset size) that are missing from the meta-dataset. Step 3 has three sub-steps:

A. For each dataset and dataset size, drop all of the rows in the meta-dataset, except those that correspond to the top 5% of the hyperparameter configurations that were evaluated in step 1 for this particular dataset and sample size.

B. In the subsample of the meta-dataset from step 1, drop all of the columns, except for the particular hyperparameter and the dataset size. Set the hyperparameter value as the target, and the dataset size as the (single) input feature. More neutral metafeatures may be used than just the dataset size; for example, the number of columns in the dataset may be included as a neutral metafeature. However, over-fitting is avoided when fewer than four metafeatures are used.

C. Fit a machine learning model on this subset of the meta-dataset, such that it can predict a high-quality hyperparameter value given a particular dataset size.

4. Selecting a Hyperparameter Scaling Model Using the Surrogate Model: For each of the hyperparameters, there are multiple candidate hyperparameter scaling models, each trained using a different amount of the meta-dataset. If trained on too little metadata, the scaling model may over-fit to random noise in the metadata, causing it to predict poor hyperparameter values for some dataset sizes. If given too much meta-data, it may not have had enough information to know which of the hyperparameter values are best, and thus it may still provide sub-par predictions. For a given metafeature, each hyperparameter scaling model from step 3 predicts (i.e. infers) hyperparameter values for various dataset sizes. Next, the surrogate model from step 2 predicts (i.e. infers) the score that each of these hyperparameter configurations would obtain on data-sets of the indicated sizes. For each hyperparameter, a respective hyperparameter scaling model is selected that has the best average predicted validation score according to the surrogate model.

The trained hyperparameter scaling models can be used in either of two ways:

Given a new dataset with a particular number of rows, these scaling models can be used to predict high-quality default values for the hyperparameters of the target ML model.

Given a new dataset, for which hyperparameter tuning needs to be done, these hyperparameter scaling models can be used to speed up the tuning process. First, a representative subsample of the new dataset can be taken. Second, hyperparameter tuning can be per-formed on this subsample of the dataset. Finally, the hyperparameter scaling model can be used to extrapo-late the best hyperparameter value for the original, full dataset size, by scaling up the best hyperparameter value that was found on the dataset sample. This use-case helps to avoid overfitting of the hyper-param-eter values that can occur due to having subsampled the dataset size.

5.0 Second Exemplary Embodiment

The following second exemplary embodiment may incor-porate aspects of embodiments presented earlier herein. Design choices in this exemplary embodiment are demon-strative and do not limit the earlier embodiments. Hyperpa-rameter scaling in this embodiment entails the following phases 1-4.

1. Large Scale Configuration Evaluation: In order to learn a dataset dependent hyperparameter scaling model, a large amount of configurations that are evaluated on a diverse set of datasets is needed. First, a supervised hyper-parameter tuning procedure is run such as ran-dom search or Bayesian optimization in order to explore and evaluate various configurations. This is run on multiple datasets in order to enable generalizations across different dataset size characteristics. Addition-ally, the datasets are down-sampled to evaluate the performance of configurations on the given differently-sized dataset. Various dataset fractions are chosen between 1% and 100%.

2. Training Surrogate Models: Hyperparameter scaling models herein suggest hyperparameter values depen-dent on the size of a given dataset. In order to evaluate the performance of the hyperparameter scaling model, the performance of its predicted configuration needs scoring. As the hyperparameter space of all possible values is practically infinite due to continuous hyper-parameter(s), predicting exactly a value that has already been evaluated is highly unlikely. For that reason, a surrogate model is trained to predict the validation score of any experimental hyperparameter configuration. That validation score facilitates choosing between various hyperparameter scaling models. The surrogate model is trained on all evaluated configura-tions (i.e. validated training scenarios).

3. Training Hyperparameter Scaling Models (i.e. optimiz-ers): Based on the evaluated configurations and their score, the dependence between the dataset size and a respective hyperparameter value is learned. To avoid training with badly performing configurations, only validated training scenarios whose empirical validation score exceeds a threshold percentile ranking are used for training optimizers. Various optimizers are trained on the top 1, 5, 10, 15, . . . 100 percent of the evaluated configurations (i.e. validated training scenarios), choosing the best performing ones according to their test score of a specified metric (e.g. ROC AUC, Pre-cision @ N, etc.). The optimizers take as input the dataset size, and output the respective hyperparameter value.

4. Model Selection according to surrogate model (i.e. metamodel): As a last step, the best performing hyper-parameter scaling model (i.e. optimizer) is selected according to the score of the previously trained surro-gate model. This is done by predicting configurations across all the dataset sizes (across dataset fractions and datasets) that were evaluated in the hyperparameter tuning step for all hyperparameter scaling models. These predicted configurations are scored by the sur-rogate model and averaged for the respective hyperpa-rameter scaling model. The optimizer with the highest score is chosen as the final hyperparameter scaling model.

Experimental results are as follows. For all of various selected scikit-learn unsupervised anomaly detectors includ-ing histogram-based outlier detection (HBOS), IsolationFor-est, and LocalOutlierFactor, validation scores of the second exemplary embodiment exceeded those of the original equipment manufacturer (OEM) default hyperparameters values. Consistent improvements in validation score statis-tics such as mean, median, and first and third quantile were observed across all three of those kinds of unsupervised anomaly detectors.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field pro-grammable gate arrays (FPGAs) that are persistently pro-grammed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
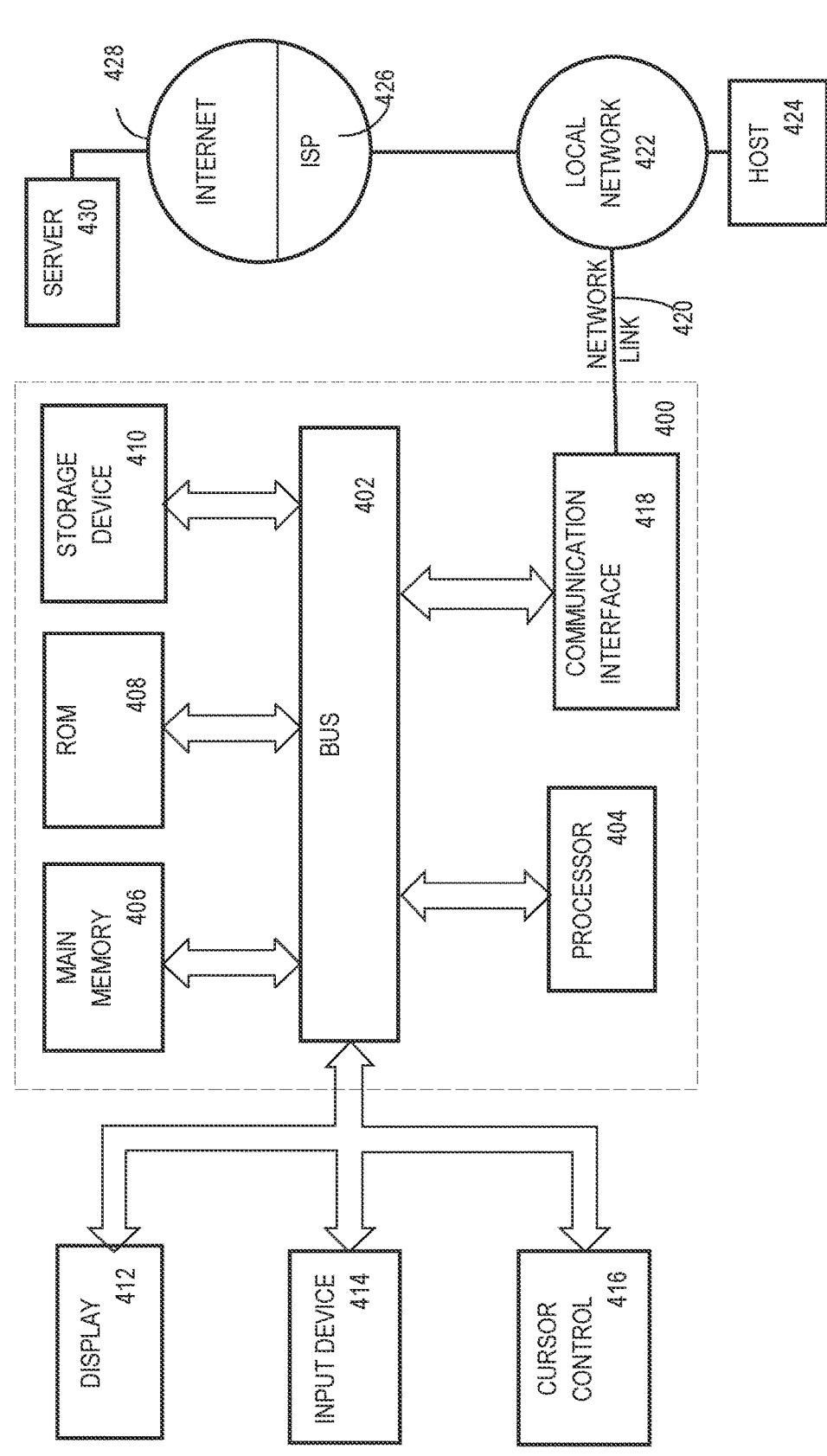
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
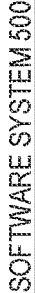
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device 1/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L–1 to a layer L. Given the number of neurons in layer L–1 and L is N[L–1] and N[L], respectively, the dimensions of matrix W is N[L–1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L–1 to L. An activation neuron represents an activation function for the layer that includes the activation function. An activation neuron in layer L corresponds to a row of weights in a matrix W for the edges between layer L and L–1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

25

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECCONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

sorting respective empirical validation scores of a plurality of validated training scenarios of an anomaly detector, wherein:

each validated training scenario has a respective training dataset to train a respective instance of the anomaly detector that is respectively configured with a respective plurality of values for a plurality of hyperparameters of the anomaly detector, and said respective training dataset has a respective set of values for a set of metafeatures;

for each ranking percentage of a plurality of predefined distinct ranking percentages:

a) selecting a subset of best training scenarios that consists of the ranking percentage of the plurality of validated training scenarios of the anomaly detector having the highest empirical validation scores;

b) training a respective linear optimizer that infers a respective value for a particular hyperparameter of the plurality of hyperparameters of the anomaly detector, wherein the training is based on the sets of values of the set of metafeatures of the training datasets of the subset of best training scenarios and the empirical validation scores of the subset of best training scenarios, c) for each set of metafeatures values in a plurality of unvalidated sets of values of the set of metafeatures, wherein the set of metafeatures values does not correspond to an actual dataset:

i) inferring, by the linear optimizer, a particular value for the particular hyperparameter of the plurality of hyperparameters of the anomaly detector;

ii) generating, into a plurality of distinct unvalidated training scenarios, a distinct unvalidated training scenario of the anomaly detector that has: the set of metafeatures values and a plurality of values for the plurality of hyperparameters of the anomaly detector that contains the particular value for the particular hyperparameter;

inferring, for each unvalidated training scenario of the plurality of distinct unvalidated training scenarios of the anomaly detector, a respective inferred validation score;

selecting a best linear optimizer of a ranking percentage of the plurality of predefined distinct ranking percentages having a highest combined inferred validation score based on said inferred validation scores for the plurality of distinct unvalidated training scenarios of the anomaly detector;

inferring, by the best linear optimizer of the ranking percentage of the plurality of predefined distinct ranking percentages, for a new dataset, an inferred value of the particular hyperparameter of the plurality of hyperparameters of the anomaly detector; and detecting, by a new instance of the anomaly detector that is based on the inferred value of the particular hyperparameter of the plurality of hyperparameters of the anomaly detector, an anomaly;

wherein the method is performed by one or more computers.

2. The method of claim 1 further comprising training a metamodel to infer a validation score of a training scenario of the anomaly detector, wherein the metamodel performs said inferring the validation scores, and the training the metamodel is based on:

the empirical validation scores of the plurality of validated training scenarios of the anomaly detector, the sets of values of the set of metafeatures of the training datasets of the plurality of validated training scenarios, and the pluralities of values of the plurality of hyperparameters of the anomaly detector.

3. The method of claim 2 wherein one selected from the group consisting of:

said training the metamodel occurs after said training the linear optimizers, and said training the metamodel and said training the linear optimizers concurrently occur.

4. The method of claim 2 further comprising:

inferring, by a second optimizer for a second particular hyperparameter of the plurality of hyperparameters of the anomaly detector, a particular value for the second particular hyperparameter;

generating, into a second plurality of distinct unvalidated training scenarios, a distinct unvalidated training scenario of the anomaly detector that has a plurality of values for the plurality of hyperparameters of the anomaly detector that contains the particular value for the second particular hyperparameter;

inferring, by the metamodel, a respective inferred validation score for each unvalidated training scenario of the second plurality of distinct unvalidated training scenarios of the anomaly detector.

5. The method of claim 4 wherein said second optimizer is one selected from the group consisting of a linear regression and a logistic regression.

6. The method of claim 2 wherein:

the plurality of validated training scenarios of the anomaly detector contains:

a first training scenario that has a first training dataset that consists of representations of instances of a first kind of object, and a second training scenario that has a second training dataset that consists of representations of instances of a second kind of object;

the first kind of object and the second kind of object are distinct kinds of objects selected from the group consisting of: a network packet, a communicated message, a log entry, a logic statement, a semi-structured document, a photograph, a database record, a logical graph, and a parse tree.

7. The method of claim 2 wherein:

said anomaly detector is a first anomaly detector;

said plurality of hyperparameters of the first anomaly detector is disjoint from a plurality of hyperparameters of a second anomaly detector;

the method further comprises:

inferring, by a linear optimizer for a particular hyperparameter of the plurality of hyperparameters of the second anomaly detector, a particular value for the particular hyperparameter of the plurality of hyperparameters of the second anomaly detector;

inferring, by a second metamodel, a respective inferred validation score for an unvalidated training scenario of the second anomaly detector that has the particular value for the particular hyperparameter of the plurality of hyperparameters of the second anomaly detector.

8. The method of claim 7 further comprising combining, in an ensemble, an instance of the first anomaly detector and an instance of the second anomaly detector.

9. The method of claim 2 wherein the metamodel does not comprise an artificial neural network.

10. The method of claim 1 wherein at least one selected from the group consisting of:

said set of metafeatures consists only of a neutral metafeature, said set of metafeatures contains a dataset cardinality metafeature, said best linear optimizer linearly scales the particular hyperparameter based on only one metafeature, and said best linear optimizer monotonically scales the particular hyperparameter.

11. The method of claim 10 further comprising:

before said inferring the inferred value of the particular hyperparameter of the plurality of hyperparameters of the anomaly detector, tuning the particular hyperparameter based on a subset of the new dataset to provide an initial value of the particular hyperparameter;

training, based on the entire new dataset, an instance of the anomaly detector that is based on the inferred value of the particular hyperparameter.

12. The method of claim 1 wherein the training datasets of the plurality of validated training scenarios of the anomaly detector contain at least one selected from the group consisting of:

two training datasets that have distinct respective dimensionalities, and two training datasets that have respective distinct pluralities of metafeatures that include said set of metafeatures.

13. The method of claim 1 wherein:

a step is based on an unlabeled training dataset;

the step is at least one selected from the group consisting of:

said inferring the inferred value of the particular hyperparameter of the plurality of hyperparameters of the anomaly detector, and said detecting the anomaly by said new instance of the anomaly detector that is based on the inferred value of the particular hyperparameter of the plurality of hyperparameters of the anomaly detector.

14. One or more non-transitory computer-readable media storing instructions that, when executed by one or more processors, cause:

sorting respective empirical validation scores of a plurality of validated training scenarios of an anomaly detector, wherein:

each validated training scenario has a respective training dataset to train a respective instance of the anomaly detector that is respectively configured with a respective plurality of values for a plurality of hyperparameters of the anomaly detector, and said respective training dataset has a respective set of values for a set of metafeatures;

for each ranking percentage of a plurality of predefined distinct ranking percentages:

a) selecting a subset of best training scenarios that consists of the ranking percentage of the plurality of validated training scenarios of the anomaly detector having the highest empirical validation scores;

b) training a respective linear optimizer that infers a respective value for a particular hyperparameter of the plurality of hyperparameters of the anomaly detector, wherein the training is based on the sets of values of the set of metafeatures of the training datasets of the subset of best training scenarios and the empirical validation scores of the subset of best training scenarios, c) for each set of metafeatures values in a plurality of unvalidated sets of values of the set of metafeatures, wherein the set of metafeatures values does not correspond to an actual dataset:

i) inferring, by the linear optimizer, a particular value for the particular hyperparameter of the plurality of hyperparameters of the anomaly detector;

ii) generating, into a plurality of distinct unvalidated training scenarios, a distinct unvalidated training scenario of the anomaly detector that has: the set of metafeatures values and a plurality of values for the plurality of hyperparameters of the anomaly detector that contains the particular value for the particular hyperparameter;

inferring, for each unvalidated training scenario of the plurality of distinct unvalidated training scenarios of the anomaly detector, a respective inferred validation score;

selecting a best linear optimizer of a ranking percentage of the plurality of predefined distinct ranking percentages having a highest combined inferred validation score based on said inferred validation scores for the plurality of distinct unvalidated training scenarios of the anomaly detector;

inferring, by the best linear optimizer of the ranking percentage of the plurality of predefined distinct ranking percentages, for a new dataset, an inferred value of the particular hyperparameter of the plurality of hyperparameters of the anomaly detector; and detecting, by a new instance of the anomaly detector that is based on the inferred value of the particular hyperparameter of the plurality of hyperparameters of the anomaly detector, an anomaly.

15. The one or more non-transitory computer-readable media of claim 14 wherein the instructions further cause training a metamodel to infer a validation score of a training scenario of the anomaly detector, wherein the metamodel performs said inferring the validation scores, and the training the metamodel is based on:

the empirical validation scores of the plurality of validated training scenarios of the anomaly detector, the sets of values of the set of metafeatures of the training datasets of the plurality of validated training scenarios, and the pluralities of values of the plurality of hyperparameters of the anomaly detector.

16. The one or more non-transitory computer-readable media of claim 15 wherein one selected from the group consisting of:

said training the metamodel occurs after said training the linear optimizers, and said training the metamodel and said training the linear optimizers concurrently occur.

17. The one or more non-transitory computer-readable media of claim 15 wherein the instructions further cause:

inferring, by a second optimizer for a second particular hyperparameter of the plurality of hyperparameters of the anomaly detector, a particular value for the second particular hyperparameter;

generating, into a second plurality of distinct unvalidated training scenarios, a distinct unvalidated training scenario of the anomaly detector that has a plurality of values for the plurality of hyperparameters of the anomaly detector that contains the particular value for the second particular hyperparameter;

inferring, by the metamodel, a respective inferred validation score for each unvalidated training scenario of the second plurality of distinct unvalidated training scenarios of the anomaly detector.

18. The one or more non-transitory computer-readable media of claim 15 wherein:

the plurality of validated training scenarios of the anomaly detector contains:

a first training scenario that has a first training dataset that consists of representations of instances of a first kind of object, and a second training scenario that has a second training dataset that consists of representations of instances of a second kind of object;

the first kind of object and the second kind of object are distinct kinds of objects selected from the group consisting of: a network packet, a communicated message, a log entry, a logic statement, a semi-structured document, a photograph, a database record, a logical graph, and a parse tree.

19. The one or more non-transitory computer-readable media of claim 15 wherein:

said anomaly detector is a first anomaly detector;

said plurality of hyperparameters of the first anomaly detector is disjoint from a plurality of hyperparameters of a second anomaly detector;

the instructions further cause:

inferring, by a linear optimizer for a particular hyperparameter of the plurality of hyperparameters of the second anomaly detector, a particular value for the particular hyperparameter of the plurality of hyperparameters of the second anomaly detector;

inferring, by a second metamodel, a respective inferred validation score for an unvalidated training scenario of the second anomaly detector that has the particular value for the particular hyperparameter of the plurality of hyperparameters of the second anomaly detector.

20. The one or more non-transitory computer-readable media of claim 14 wherein the training datasets of the plurality of validated training scenarios of the anomaly detector contain at least one selected from the group consisting of:

two training datasets that have distinct respective dimensionalities, and two training datasets that have respective distinct pluralities of metafeatures that include said set of metafeatures.

\* \* \* \* \*